United States Patent
Inoue et al.

(10) Patent No.: US 11,750,923 B2
(45) Date of Patent: Sep. 5, 2023

(54) VEHICLE CONTROL SYSTEM, VEHICLE CONTROL METHOD, CONTROLLER, AND NON-TRANSITORY STORAGE MEDIUM

(71) Applicant: TOYOTA JIDOSHA KABUSHIKI KAISHA, Toyota (JP)

(72) Inventors: Yu Inoue, Toyota (JP); Tomoaki Iida, Okazaki (JP); Satoshi Kobayashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/510,858

(22) Filed: Oct. 26, 2021

(65) Prior Publication Data
US 2022/0201209 A1 Jun. 23, 2022

(30) Foreign Application Priority Data

Dec. 23, 2020 (JP) ................................ 2020-214205

(51) Int. Cl.
- *H04N 23/667* (2023.01)
- *B60R 11/04* (2006.01)
- *H04N 7/18* (2006.01)

(52) U.S. Cl.
CPC .......... *H04N 23/667* (2023.01); *B60R 11/04* (2013.01); *H04N 7/183* (2013.01)

(58) Field of Classification Search
CPC .... H04N 23/667; H04N 23/651; H04N 7/183; B60R 2300/70; B60R 11/04; B60R 11/23
See application file for complete search history.

(56) References Cited

U.S. PATENT DOCUMENTS

| | | | |
|---|---|---|---|
| 8,325,986 B2 | 12/2012 | Schofield et al. | |
| 10,325,550 B2* | 6/2019 | Okohira | G09G 3/2096 |
| 2017/0140699 A1 | 5/2017 | Okohira | |
| 2017/0297498 A1 | 10/2017 | Larson et al. | |
| 2017/0372176 A1 | 12/2017 | Hibino et al. | |
| 2018/0072229 A1* | 3/2018 | Mano | H04N 23/634 |
| 2018/0345867 A1 | 12/2018 | Imamura et al. | |
| 2020/0207309 A1* | 7/2020 | Hathe | H04N 23/65 |
| 2021/0400209 A1 | 12/2021 | Yamanaka et al. | |

FOREIGN PATENT DOCUMENTS

| | | |
|---|---|---|
| CN | 106573575 A | 4/2017 |
| CN | 107826037 A | 3/2018 |
| CN | 111385534 A | 7/2020 |
| JP | 2019-091066 A | 6/2019 |
| WO | 2020/090512 A1 | 5/2020 |

* cited by examiner

*Primary Examiner* — Kathleen V Nguyen
(74) *Attorney, Agent, or Firm* — Dinsmore & Shohl LLP

(57) ABSTRACT

A vehicle control system includes: a sensor; a first controller configured to output a first control signal for controlling the sensor via the first signal line; and a second controller configured to output a second control signal for controlling the sensor via the first signal line and the second signal line, wherein the sensor is configured to operate according to the first control signal output from the first controller via the first signal line when a vehicle state that indicates a state of a vehicle is a first state, and operate according to the second control signal output from the second controller via the first signal line and the second signal line when the vehicle state is a second state.

6 Claims, 3 Drawing Sheets

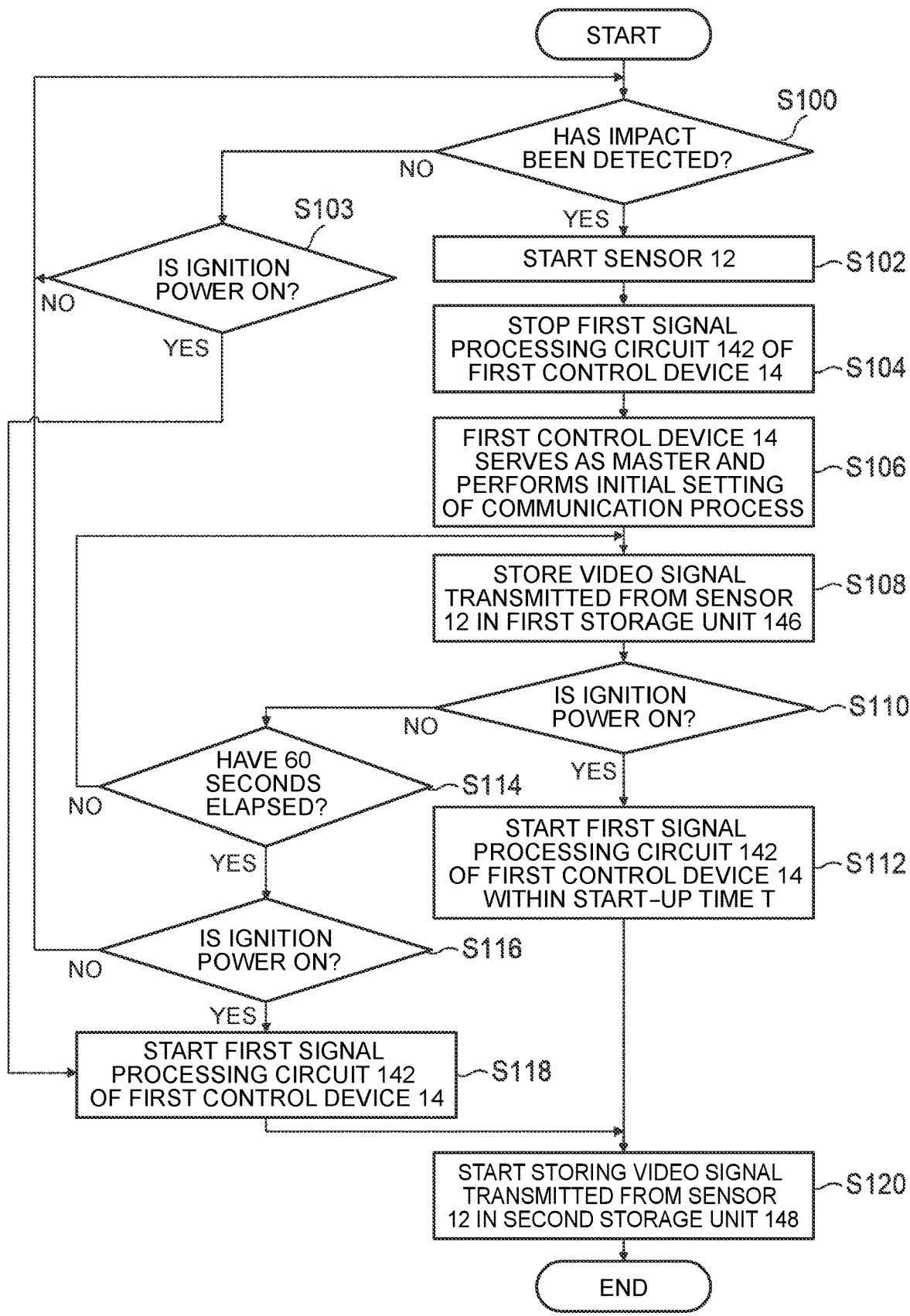

VEHICLE CONTROL SYSTEM, VEHICLE CONTROL METHOD, CONTROLLER, AND NON-TRANSITORY STORAGE MEDIUM

CROSS-REFERENCE TO RELATED APPLICATION

This application claims priority to Japanese Patent Application No. 2020-214205 filed on Dec. 23, 2020, incorporated herein by reference in its entirety.

BACKGROUND

1. Technical Field

The present disclosure relates to a vehicle control system, a vehicle control method, a controller, and a non-transitory storage medium.

2. Description of Related Art

A technique is known in which a camera controls a plurality of accessory devices (e.g., Japanese Unexamined Patent Application Publication No. 2019-91066 (JP 2019-91066 A)). JP 2019-91066 A discloses a technique in which when a camera detects a signal output from any of a plurality of accessory devices for a request, the camera performs response communication to the request in a data communication channel. Specifically, J P 2019-91066 A discloses that broadcast communication in which data is simultaneously transmitted from a camera microcomputer 205 that serves as a communication master to a lens microcomputer 111 and an adapter microcomputer 302 that serve as communication slaves is started from the communication slave (see, e.g., paragraph [0082] of JP 2019-91066 A).

SUMMARY

In the case where one sensor is controlled by a plurality of control devices (controllers), one of the control devices needs to serve as a master and the remainder of the control devices needs to serve as a slave. For example, it is herein assumed that a plurality of electronic control units (ECUs) is mounted on a vehicle and one sensor is controlled by the ECUs. The plurality of ECUs is an example of the plurality of control devices. In this case, when one of the ECUs tries to control the sensor according to the state of the vehicle, this ECU needs to serve as a master and the remainder of the ECUs needs to be a slave.

In this respect, in the system of JP 2019-91066 A, the camera microcomputer is always a master and the lens microcomputer and the adapter microcomputer are always slaves. The master therefore cannot be switched among the microcomputers. That is, it is not possible to switch the control device that controls the sensor according to the state of the vehicle.

The present disclosure provides a technique of switching a control device (a controller) that controls a sensor according to the state of a vehicle.

A vehicle control system according to a first aspect of the present disclosure includes: a sensor; a first controller connected to the sensor via a first signal line, the first controller being configured to receive a signal output from the sensor via the first signal line, and output a first control signal for controlling the sensor via the first signal line; and a second controller connected to the first controller via a second signal line, the second controller being configured to receive the signal output from the sensor via the first signal line and the second signal line, and output a second control signal for controlling the sensor via the first signal line and the second signal line, wherein the sensor is configured to operate according to the first control signal output from the first controller via the first signal line when a vehicle state that indicates a state of a vehicle is a first state, and operate according to the second control signal output from the second controller via the first signal line and the second signal line when the vehicle state is a second state.

A vehicle control method according to a second aspect of the present disclosure is performed by a vehicle control system including a sensor, a first controller connected to the sensor via a first signal line, the first controller being configured to receive a signal output from the sensor via the first signal line, and output a first control signal for controlling the sensor via the first signal line, and a second controller connected to the first controller via a second signal line, the second controller being configured to receive the signal output from the sensor via the first signal line and the second signal line, and output a second control signal for controlling the sensor via the first signal line and the second signal line. The vehicle control method includes: causing the sensor to operate according to the first control signal output from the first controller via the first signal line when a vehicle state that indicates a state of a vehicle is a first state; and causing the sensor to operate according to the second control signal output from the second controller via the first signal line and the second signal line when the vehicle state is a second state.

A controller according to a third aspect of the present disclosure is in a vehicle control system, including a sensor, the controller connected to the sensor via a first signal line, the controller being configured to receive a signal output from the sensor via the first signal line, and output a first control signal for controlling the sensor via the first signal line, and a second controller connected to the controller via a second signal line, the second controller being configured to receive the signal output from the sensor via the first signal line and the second signal line, and output a second control signal for controlling the sensor via the first signal line and the second signal line. The controller includes a processor configured to: stop transmission of the second control signal output from the second controller to the sensor when a vehicle state that indicates a state of a vehicle is a first state; and transmit the second control signal output from the second controller to the sensor when the vehicle state is a second state.

A non-transitory storage medium according to a fourth aspect of the present disclosure stores a program that are executable by a computer that configures a controller in vehicle control system and that cause the computer to perform functions. The vehicle control system includes a sensor, the controller connected to the sensor via a first signal line, the controller being configured to receive a signal output from the sensor via the first signal line, and output a first control signal for controlling the sensor via the first signal line, and a second controller connected to the controller via a second signal line, the second controller being configured to receive the signal output from the sensor via the first signal line and the second signal line, and output a second control signal for controlling the sensor via the first signal line and the second signal line. The functions includes: stopping transmission of the second control signal output from the second controller to the sensor when a vehicle state that indicates a state of a vehicle is a first state;

and transmitting the second control signal output from the second controller to the sensor when the vehicle state is a second state.

As described above, the present disclosure is advantageous in that the controller that controls the sensor can be switched according to the state of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 shows an example of a process that is performed by a first control device of the vehicle control system according to the embodiment.

DETAILED DESCRIPTION OF EMBODIMENTS

First Embodiment

Vehicle Control System

Figure 1:
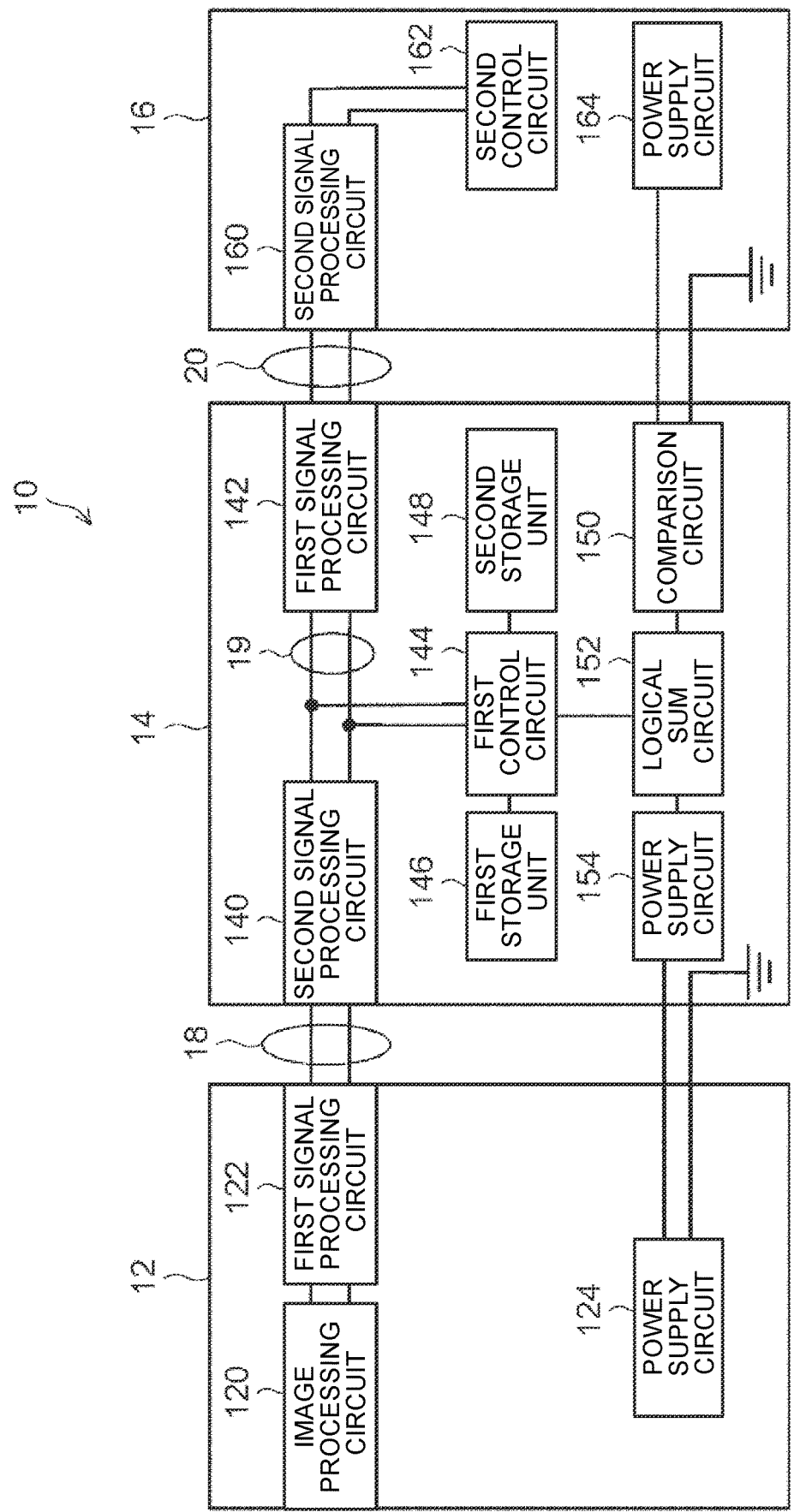
FIG. 1 is a schematic block diagram of a vehicle control system according to an embodiment.

FIG. 1 is a block diagram showing an example of a functional configuration of a vehicle control system 10 according to a first embodiment. As shown in FIG. 1, the vehicle control system 10 includes a sensor 12, a first control device (a first controller) 14, and a second control device (a second controller) 16. The vehicle control system 10 is mounted on a vehicle. The first control device 14 and the second control device 16 are ECUs.

The sensor 12 of the first embodiment is a camera mounted on the vehicle, the first control device 14 is a drive recorder control device (a drive recorder controller), and the second control device 16 is an electronic inner mirror control device (an electronic inner mirror controller). The first control device 14 records a video signal transmitted from the sensor 12 that is a camera. The second control device 16 causes the video signal transmitted from the sensor 12 that is a camera to be displayed on a display device (not shown).

As shown in FIG. 1, the sensor 12 and the first control device 14 are connected via a first signal line 18. The first control device 14 and the second control device 16 are connected via a second signal line 20. The sensor 12, the first control device 14, and the second control device 16 are thus connected in series via the first signal line 18 and the second signal line 20.

The video signal captured by the sensor 12 is transmitted to the first control device 14 via the first signal line 18. The video signal captured by the sensor 12 is transmitted to the second control device 16 via the first signal line 18 and the second signal line 20.

A control signal for controlling the sensor 12 output from the first control device 14 is transmitted to the sensor 12 via the first signal line 18. A control signal for controlling the sensor 12 output from the second control device 16 is transmitted to the sensor 12 via the first signal line 18 and the second signal line 20.

A communication process between the sensor 12 and the first and second control devices 14 and 16 is implemented by, e.g., known I2C communication.

In the vehicle control system 10 of the present embodiment, the control device that serves as a master is switched according to the vehicle state that indicates the state of the vehicle. Specifically, in the vehicle control system 10, the master is switched so that the first control device 14 serves as a master when the vehicle state is a first state and the second control device 16 serves as a master when the vehicle state is a second state. Hereinafter, this will be described specifically.

Sensor

As shown in FIG. 1, the sensor 12 includes an image processing circuit 120, a first signal processing circuit 122, and a power supply circuit 124.

The image processing circuit 120 receives light input through a lens (not shown) and generates a video signal. The image processing circuit 120 outputs the video signal to the first signal processing circuit 122.

The first signal processing circuit 122 converts the video signal output from the image processing circuit 120 to a serial signal. The first signal processing circuit 122 outputs the serial signal corresponding to the video signal to the first control device 14.

The first signal processing circuit 122 receives a control signal output from the first control device 14 or the second control device 16. As shown in FIG. 1, the sensor 12, the first control device 14, and the second control device 16 are connected in series via the first signal line 18 and the second signal line 20. Accordingly, the control signal output from the second control device 16 reaches the sensor 12 via the first control device 14. When the first signal processing circuit 122 receives the control signal, the first signal processing circuit 122 outputs the received control signal to the image processing circuit 120.

The power supply circuit 124 supplies power to the first control device 14 according to a received signal. As shown in FIG. 1, the power supply circuit 124 of the sensor 12 receives a power supply control signal output from the first control device 14 and the second control device 16. When the power supply circuit 124 receives the power supply control signal, the power supply circuit 124 supplies power to the first control device 14.

First Control Device

The first control device 14 is connected to the sensor 12 via the first signal line 18, receives a signal output from the sensor 12 via the first signal line 18, and outputs a control signal for controlling the sensor 12 via the first signal line 18. Since the first control device 14 is a drive recorder control device, the first control device 14 records a video signal captured by the sensor 12.

As shown in FIG. 1, the first control device 14 includes a second signal processing circuit 140, a first signal processing circuit 142, a first control circuit 144, a first storage unit 146, a second storage unit 148, a comparison circuit 150, a logical sum circuit 152, and a power supply circuit 154.

The second signal processing circuit 140 receives a serial signal of the video signal output from the sensor 12. The second signal processing circuit 140 converts the received serial signal to a parallel signal. The second signal processing circuit 140 transmits a control signal output from the second control device 16 to the sensor 12.

The first signal processing circuit 142 converts the parallel signal corresponding to the video signal obtained by the second signal processing circuit 140 to a serial signal. The first signal processing circuit 142 outputs the serial signal corresponding to the video signal to the second control device 16. The first signal processing circuit 142 is an example of the signal processing circuit of the present disclosure.

As shown in FIG. 1, the first signal line 18 and the second signal line 20 are connected via the second signal processing circuit 140, an in-device signal line 19, and the first signal processing circuit 142. Accordingly, the first signal processing circuit 142 transmits a signal transmitted via the first signal line 18, the second signal processing circuit 140, and the in-device signal line 19 to the second signal line 20. The first signal processing circuit 142 transmits a signal transmitted via the second signal line 20 to the first signal line 18 via the in-device signal line 19 and the second signal processing circuit 140.

The first control circuit 144 receives the parallel signal corresponding to the video signal obtained by the second signal processing circuit 140, and stores the received parallel signal in the first storage unit 146 or the second storage unit 148.

A video signal transmitted from the sensor 12 is stored in the first storage unit 146. As will be described later, a video signal captured when the ignition power of the vehicle is off and a predetermined or greater impact on the vehicle has been detected is stored in the first storage unit 146. This will be described in detail later.

A video signal transmitted from the sensor 12 is stored in the second storage unit 148. As will be described later, a video signal captured when the ignition power of the vehicle is on is stored in the second storage unit 148. This will be described in detail later.

When the comparison circuit 150 receives a power supply control signal output from a power supply circuit 164 of the second control device 16, the comparison circuit 150 outputs a signal to the logical sum circuit 152. The comparison circuit 150 is a known comparator. The comparison circuit 150 compares the voltages of two signals and outputs a signal when the voltage of one signal is higher than the voltage of the other.

When the logical sum circuit 152 detects a power supply control signal output from either or both of the first control circuit 144 and the second control device 16, the logical sum circuit 152 outputs a signal to the power supply circuit 154.

When the power supply circuit 154 receives the signal output from the logical sum circuit 152, the power supply circuit 154 outputs a power supply control signal to the sensor 12.

Second Control Device

The second control device 16 is connected to the first control device 14 via the second signal line 20, receives a signal output from the sensor 12 via the first signal line 18 and the second signal line 20, and outputs a second control signal for controlling the sensor 12 via the first signal line 18 and the second signal line 20. Since the second control device 16 is an electronic inner mirror control device, the second control device 16 causes a video signal captured by the sensor 12 to be displayed on the display device (not shown).

As shown in FIG. 1, the second control device 16 includes a second signal processing circuit 160, a second control circuit 162, and the power supply circuit 164.

The second signal processing circuit 160 converts a received serial signal to a parallel signal. The second signal processing circuit 160 transmits a control signal output from the second control circuit 162 to the sensor 12 via the first control device 14.

The second control circuit 162 receives the parallel signal of the video signal obtained by the second signal processing circuit 160 and causes the video signal to be displayed on the display device (not shown). The second control circuit 162 outputs a control signal for controlling the sensor 12.

The power supply circuit 164 operates with the ignition power. The power supply circuit 164 supplies power to the second control device 16 when the ignition power is on. Accordingly, the second control device 16 operates when the ignition power of the vehicle is on.

The sensor 12, the first control device 14, and the second control device 16 are implemented by, e.g., a semiconductor integrated circuit, more specifically, an application-specific integrated circuit (ASIC) etc.

Figure 2:
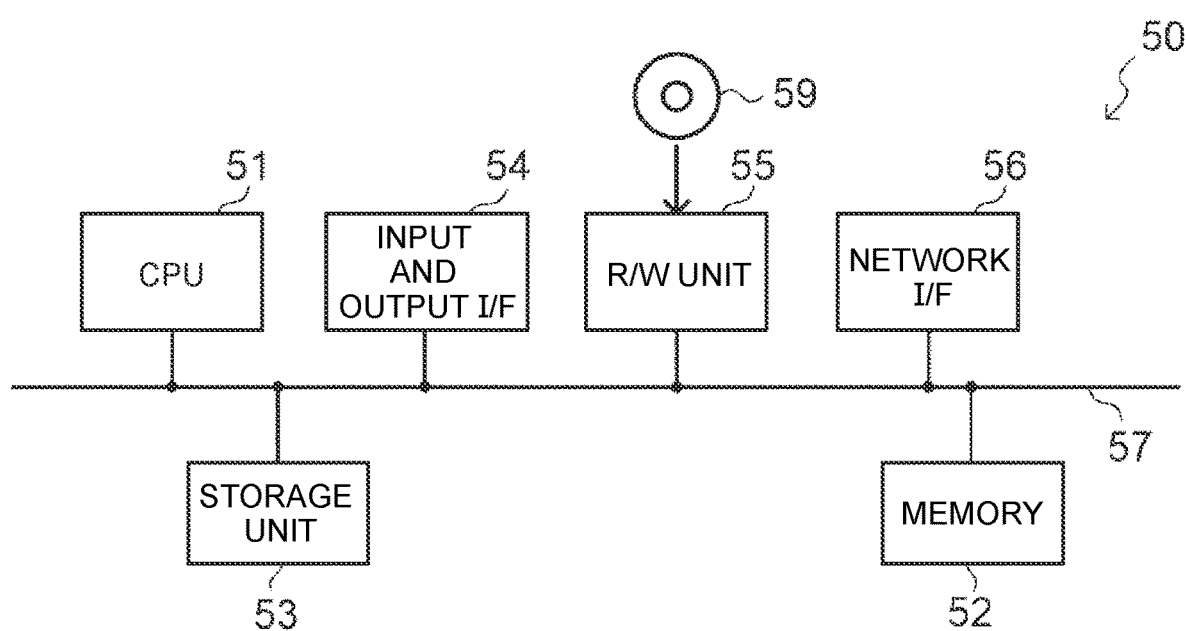
FIG. 2 shows a configuration example of a computer of each device according to the embodiment.

The sensor 12, the first control device 14, and the second control device 16 can also be implemented by, e.g., such a computer 50 as shown in FIG. 2. The computer 50 that implements the sensor 12, the first control device 14, and the second control device 16 includes a central processing unit (CPU) 51, a memory 52 that is a temporary storage area, and a nonvolatile storage unit 53. The computer 50 further includes an input and output interface (I/F) 54 to which an input and output device etc. (not shown) is connected, and a read and write (R/W) unit 55 that controls reading and writing of data from and to a recording medium 59. The computer 50 further includes a network I/F 56 connected to a network such as the Internet. The CPU 51, the memory 52, the storage unit 53, the input and output I/F 54, the R/W unit 55, and the network I/F 56 are connected to each other via a bus 57.

The storage unit 53 can be implemented by a hard disk drive (HDD), a solid-state drive (SSD), a flash memory, etc. A program for causing the computer 50 to function is stored in the storage unit 53 that is a storage medium. The CPU 51 reads the program from the storage unit 53, loads the program into the memory 52, and sequentially performs processes of the program.

Next, the functions of the vehicle control system 10 of the embodiment will be described.

As an example, it is herein assumed that there are two vehicle states. Specifically, in the following example, there are a first state and a second state. The first state indicates a vehicle state in which the ignition power is off and a predetermined or greater impact on the vehicle has been detected, and the second state indicates a vehicle state in which the ignition power is on.

When the vehicle is stopped and the ignition power of the vehicle is off, the first control device 14 performs a process shown in FIG. 3.

In step S100, the first control circuit 144 of the first control device 14 determines whether a predetermined or greater impact on the vehicle has been detected. The impact on the vehicle is detected by other ECU (not shown). When the first control circuit 144 receives a signal output from this ECU, the first control circuit 144 determines that a predetermined or greater impact on the vehicle has been detected. When a predetermined or greater impact on the vehicle has been detected in step S100, the vehicle state switches to the first state, and the routine proceeds to step S102. On the other hand, when a predetermined or greater impact on the vehicle has not been detected, the routine proceeds to step S103.

In step S102, the first control circuit 144 of the first control device 14 starts the sensor 12 by outputting a power supply control signal indicating starting of the sensor 12.

Specifically, when the first control circuit 144 outputs a power supply control signal, the logical sum circuit 152 outputs a signal to the power supply circuit 154 in response to the power supply control signal. The power supply circuit 154 of the first control device 14 then outputs a power supply control signal to the power supply circuit 124 of the sensor 12.

The power supply circuit 124 of the sensor 12 starts the sensor 12 by supplying power to the sensor 12 in response to the power supply control signal from the first control device 14. The image processing circuit 120 of the started sensor 12 starts capturing a video. The image processing circuit 120 transmits a video signal to the first control device 14 via the first signal processing circuit 122. The first signal processing circuit 122 converts the video signal that is a parallel signal to a serial signal, and then transmits the serial signal corresponding to the video signal to the first control device 14.

In step S103, the first control circuit 144 determines whether the ignition power is on. The ignition power is switched from off to on by an operation performed by an occupant of the vehicle. When the ignition power is on, the routine proceeds to step S118 that will be described later. When the ignition power is off, the routine returns to step S100, and the determination process in step S100 is repeated.

In step S104, the first control circuit 144 of the first control device 14 performs control to stop signal transmission of the first signal processing circuit 142. Specifically, the first control circuit 144 of the first control device 14 performs control to stop signal transmission of the first signal processing circuit 142 by resetting the first signal processing circuit 142 that is a serialization circuit.

Therefore, even if a control signal for the sensor 12 is sent from the second control device 16, this control signal will not reach the sensor 12 as the first signal processing circuit 142 of the first control device 14 does not perform signal transmission. Accordingly, when the vehicle state is the first state, the first control device 14 serves as a master, and the sensor 12 operates according to a control signal output from the first control device 14.

In step S106, the first control circuit 144 of the first control device 14 performs initial setting of a communication process for receiving a video signal. For example, the first control circuit 144 performs initial setting of a communication process for the I2C communication.

Thereafter, in step S108, the first control circuit 144 of the first control device 14 receives a video signal transmitted from the sensor 12 via the second signal processing circuit 140. The second signal processing circuit 140 converts the video signal that is a serial signal to a parallel signal and then outputs the parallel signal corresponding to the video signal to the first control circuit 144. In step S108, the first control circuit 144 then stores the received video signal in the first storage unit 146.

The first control circuit 144 stores the video signal in the first storage unit 146 until a predetermined time (e.g., 60 seconds) has elapsed since the sensor 12 was started. The first control circuit 144 will not store the received video signal in the first storage unit 146 after the predetermined time has elapsed since the sensor 12 was started.

In step S110, the first control circuit 144 determines whether the ignition power is on. When the ignition power is on, the routine proceeds to step S112. When the ignition power is off, the routine proceeds to step S114.

The state in which the ignition power is off and an impact has been detected indicates that the vehicle state is the first state. Accordingly, when the vehicle has changed from the state in which the ignition power is off and an impact has been detected to the state in which the ignition power is on, it means that the vehicle state has changed from the first state to the second state. The ignition power is switched from off to on by an operation performed by an occupant of the vehicle.

In step S112, the first control circuit 144 performs control to enable signal transmission of the first signal processing circuit 142. Specifically, the first control circuit 144 performs control to enable signal transmission of the first signal processing circuit 142 within a predetermined start-up time T after the vehicle state changed from the first state to the second state. More specifically, the first control circuit 144 of the first control device 14 performs control to enable signal transmission of the first signal processing circuit 142 by releasing the first signal processing circuit 142 that is a serialization circuit from the reset state.

Even when the ignition power is switched from off to on, the second control device 16 will not start immediately. After the ignition power is turned on, it takes a certain amount of time until the power supply circuit 164 of the second control device 16 receives the signal and starts the second control device 16.

Accordingly, in the vehicle control system 10 of the first embodiment, the start-up time T is set in advance according to the following expression (1).

$$T \leq t_{min\_veam} + \sigma_{IG\_ON} \tag{1}$$

As shown in the above expression (1), the start-up time T is set in advance to a value equal to or smaller than the sum of a variation $\sigma_{IG\_ON}$ in time it takes each ECU mounted on the vehicle to be started after the ignition power is turned on and a time $t_{min\_veam}$ it takes the started second control device 16 to start the sensor 12 when the vehicle state changes from the first state to the second state. The time $t_{min\_veam}$ it takes the started second control device 16 to start the sensor 12 is also the time required until the started second control device 16 starts outputting control signals to other devices. Since the first control circuit 144 needs to perform control to enable signal transmission of the first signal processing circuit 142 before the second control device 16 starts outputting control signals, the start-up time T is set according to the time $t_{min\_veam}$ as shown by the expression (1).

The start-up time T is not limited to the above expression (1), and may be set in any manner. For example, the start-up time T may be simply set to the time it takes the second control device 16 to start after the vehicle state changed from the first state to the second state.

The first control circuit 144 of the first control device 14 performs control to enable signal transmission of the first signal processing circuit 142 within the start-up time T. A control signal output from the second control device 16 is thus transmitted to the sensor 12 via the first signal processing circuit 142. The first signal processing circuit 142 and the second signal processing circuit 140 of the first control device 14 transmit the control signal output from the second control device 16 to the sensor 12 as it is. The sensor 12 operates according to the control signal output from the second control device 16 via the first signal line 18 and the second signal line 20.

Accordingly, when the vehicle state is the second state, the second control device 16 serves as a master and the first control device 14 serves as a slave. For example, the second control device 16 outputs a control signal for setting of an image clipping position in the video signal captured by the sensor 12, enlargement or reduction of an image, a frame rate, etc. to the sensor 12 according to a signal received from the occupant of the vehicle or other ECU.

In step S114, the first control circuit 144 of the first control device 14 determines whether a predetermined time (e.g., 60 seconds) has elapsed since a predetermined or greater impact on the vehicle was detected. When 60 seconds have elapsed since a predetermined or greater impact on the vehicle was detected, the routine proceeds to step S116. On the other hand, when 60 seconds have not elapsed since a predetermined or greater impact on the vehicle was detected, the routine returns to step S108, and the video signal continues to be stored in the first storage unit 146.

In step S116, the first control circuit 144 of the first control device 14 determines whether the ignition power is on. When the ignition power is on, the routine proceeds to step S118. When the ignition power is off, the determination process in step S100 is repeated.

In step S118, the first control circuit 144 performs control to enable signal transmission of the first signal processing circuit 142. At this time, the first control circuit 144 performs setting to end the communication process for the I2C communication.

After step S112 or step S118 is finished, the second control device 16 serves as a master. Therefore, a communication process for the I2C communication is started by the second control device 16 performing initial setting of the communication process for the I2C communication etc.

In step S120, the first control circuit 144 starts storing the received video signal in the second storage unit 148. The process of recording the video signal in step S120 is a normal recording process, and the video signal is sequentially stored in the second storage unit 148.

As described above, the vehicle control system 10 according to the first embodiment includes the sensor 12, the first control device 14, and the second control device 16. The first control device 14 is connected to the sensor 12 via the first signal line 18, receives a signal output from the sensor 12 via the first signal line 18, and outputs a control signal for controlling the sensor 12 via the first signal line 18. The second control device 16 is connected to the first control device 14 via the second signal line 20, receives a signal output from the sensor 12 via the first signal line 18 and the second signal line 20, and outputs a control signal for controlling the sensor 12 via the first signal line 18 and the second signal line 20. As described above, in the vehicle control system 10 according to the embodiment, the sensor 12, the first control device 14, and the second control device 16 are connected in series via the first signal line 18 and the second signal line 20.

When the vehicle state is the first state, the sensor 12 operates according to the control signal output from the first control device 14 via the first signal line 18. When the vehicle state is the second state, the sensor 12 operates according to the control signal output from the second control device 16 via the first signal line 18 and the second signal line 20.

When the vehicle state is the first state, the first control device 14 performs control to stop signal transmission of the first signal processing circuit 142. As shown in FIG. 1, the sensor 12, the first control device 14, and the second control device 16 are connected in series via the first signal line 18 and the second signal line 20. Accordingly, even if a control signal for the sensor 12 is sent from the second control device 16, this control signal will not reach the sensor 12 as signal transmission of the first signal processing circuit 142 of the first control device 14 is stopped and the first signal processing circuit 142 does not perform signal transmission. Accordingly, when the vehicle state is the first state, the first control device 14 serves as a master, and the sensor 12 operates according to the control signal output from the first control device 14.

On the other hand, when the vehicle state is the second state, the first control device 14 performs control to enable signal transmission of the first signal processing circuit 142. Accordingly, when the vehicle state is the second state, the master is switched from the first control device 14 to the second control device 16. When the vehicle state is the second state, the second control device 16 serves as a master, and the sensor 12 operates according to the control signal output from the second control device 16. Therefore, according to the vehicle control system 10 of the present embodiment, the control device that controls the sensor can be switched according to the state of the vehicle.

In the vehicle control system 10 of the present embodiment, the sensor 12, the first control device 14, and the second control device 16 are connected in series via the first signal line 18 and the second signal line 20. This configuration requires only one output from the sensor 12 and can therefore reduce an increase in size and cost of the sensor 12 itself that would be caused by, e.g., providing a plurality of outputs from the sensor 12.

In the vehicle control system 10 of the present embodiment, the sensor 12, the first control device 14, and the second control device 16 are connected in series. When the vehicle state is the first state, the first signal processing circuit 142 of the first control device 14 stops signal transmission. Accordingly, the sensor 12 can be appropriately controlled without a conflict between the control signal output from the second control device 16 and the control signal output from the first control device 14.

Until the vehicle state changes to the first state, only the first control device 14 need be operated by a constant power supply, and the sensor 12 and the second control device 16 can be stopped. Power consumption can therefore be reduced.

Second Embodiment

Next, a second embodiment will be described. Since the configuration of a vehicle control system of the second embodiment is similar to the first embodiment, the same signs as those of the first embodiment are used, and description thereof will be omitted.

The vehicle control system 10 of the second embodiment is different from the first embodiment in that the control device that controls the sensor 12 is switched according to whether the vehicle state is an automatic parking state or an automatic driving state. The sensor 12 of the second embodiment is also a camera. The first control device 14 of the second embodiment is an automatic parking control device (an automatic parking controller), and the second control device 16 is an automatic driving control device (an automatic driving controller).

It is presumed that the method for controlling the sensor 12 that is a camera is different depending on whether the vehicle state is the automatic parking state or the automatic driving state. For example, when the vehicle state is the automatic parking state, a video of a front lower part or rear lower part of the vehicle is obtained, and when the vehicle state is the automatic driving state, a video further ahead of the vehicle is obtained.

Accordingly, when the vehicle state is a first state indicating the automatic parking state, the first control device 14 of the second embodiment outputs to the sensor 12 a control signal indicating a request for a first region of a video captured by the sensor 12. The sensor 12 outputs a video signal indicating the first region of the captured video in response to the control signal of the first control device 14. For example, the first region is a region indicating the lower half of the captured video.

When the vehicle state is a second state indicating the automatic driving state, the second control device 16 of the second embodiment outputs to the sensor 12 a control signal indicating a request for a second region of a video captured by the sensor 12. The sensor 12 outputs a video signal indicating the second region of the captured video in response to the control signal of the second control device 16. For example, the second region is a region indicating the upper half of the captured video.

For example, the vehicle state changes to the first state when a shift lever is shifted to the reverse position. The vehicle state changes to the second state when the shift lever is shifted to the drive position.

The first control device 14 of the second embodiment performs control to stop signal transmission of the first signal processing circuit 142 when the vehicle state is the first state, and performs control to enable signal transmission of the first signal processing circuit 142 when the vehicle state is the second state.

Accordingly, either the first control device 14 or the second control device 16 serves as a master depending on whether the vehicle state is the automatic parking state or the automatic driving state, and the sensor 12 is appropriately controlled.

As described above, according to the vehicle control system 10 of the second embodiment, the control device that controls the sensor can be switched according to whether the vehicle state is the automatic parking state or the automatic driving state.

In the examples described in the above embodiments, the processing that is executed by each device is executed by hardware. However, this processing may be software processing that is executed by executing a program. Alternatively, this processing may be a combination of software processing and hardware processing. In this case, the program stored in a read-only memory (ROM) may be stored in various storage media for distribution.

For example, it is herein assumed that the first control device 14 is configured by a computer and the functions of the first control device 14 are implemented by the computer executing the program. In this case, the computer performs a process of stopping transmission of a control signal output from the second control device 16 when the vehicle state is the first state, and transmitting the control signal output from the second control device 16 when the vehicle state is the second state.

The present disclosure is not limited to the above, and it should be understood that, in addition to the above embodiments, the present disclosure can be modified in various forms without departing from the spirit and scope of the present disclosure.

For example, in the example described in the first embodiment, the first state is the state in which the ignition power is off and a predetermined or greater impact on the vehicle has been detected, and the second state is the state in which the ignition power is on. In the example described in the second embodiment, the first state is the automatic parking state and the second state is the automatic driving state. However, the vehicle state may be any state.

In the examples described in the above embodiments, the sensor is a camera. However, the sensor is not limited to the camera. For example, the sensor may be a millimeter-wave radar etc.

A vehicle control system according to a first aspect of the present disclosure includes: a sensor; a first controller connected to the sensor via a first signal line, the first controller being configured to receive a signal output from the sensor via the first signal line, and output a first control signal for controlling the sensor via the first signal line; and a second controller connected to the first controller via a second signal line, the second controller being configured to receive the signal output from the sensor via the first signal line and the second signal line, and output a second control signal for controlling the sensor via the first signal line and the second signal line, wherein the sensor is configured to operate according to the first control signal output from the first controller via the first signal line when a vehicle state that indicates a state of a vehicle is a first state, and operate according to the second control signal output from the second controller via the first signal line and the second signal line when the vehicle state is a second state.

According to the above aspect, when the vehicle state is the first state, the sensor operates according to the control signal output from the first controller via the first signal line. When the vehicle state is the second state, the sensor operates according to the control signal output from the second controller via the first signal line and the second signal line. Accordingly, the controller that controls the sensor can be switched according to the state of the vehicle.

In the above aspect, the first controller may include a signal processing circuit; the first signal line and the second signal line may be connected via the signal processing circuit; the signal processing circuit may be configured to transmit a signal transmitted via the first signal line to the second signal line, and transmit a signal transmitted via the second signal line to the first signal line; and the first controller may be configured to perform control to stop signal transmission of the signal processing circuit when the vehicle state is the first state, and perform control to enable the signal transmission of the signal processing circuit when the vehicle state is the second state.

According to the above configuration, when the vehicle state is the first state, the signal transmission of the signal processing circuit located between the first signal line and the second signal line is stopped. Therefore, the control signal output from the second controller will not reach the sensor. Accordingly, not both of the first controller and the second controller serve as a master, and the sensor can be appropriately controlled.

In the above aspect, the second controller may be configured to operate when ignition power of the vehicle is on; the first state may be a state in which the ignition power is off; and the second state may be a state in which the ignition power is on.

With the above configuration, the controller that controls the sensor can be switched according to whether the vehicle state is the state in which the ignition power supply is off or the state in which the ignition power supply is on.

In the above aspect, the first state may be a state in which the ignition power is off and a predetermined or greater impact on the vehicle has been detected.

With the above configuration, the controller that controls the sensor can be switched according to whether the vehicle state is the state in which the ignition power is off and a predetermined or greater impact on the vehicle has been detected or the state in which the ignition power is on.

In the above aspect, the first controller may be configured to perform control to operate the signal processing circuit within a time in which the second controller is started when the vehicle state changes from the first state to the second state.

According to the above configuration, the signal transmission operation of the signal processing circuit is started by the time the control signal is output from the second controller. Thus the controller that controls the sensor can be switched at an appropriate timing.

In the above aspect, the sensor may be a camera mounted on the vehicle; the first controller may be a drive recorder controller; the second controller may be an electronic inner mirror controller; and the first controller may be configured to store a video signal output from the camera in a predetermined storage unit.

With the above configuration, the controller that controls the camera can be switched between the drive recorder controller and the electronic inner mirror controller.

In the above aspect, the first state may be an automatic parking state, and the second state may be an automatic driving state.

With the above configuration, the controller that controls the sensor can be switched according to whether the vehicle state is the automatic parking state or the automatic driving state.

In the above aspect, the sensor may be a camera mounted on the vehicle; the first controller may be an automatic parking controller; the second controller may be an automatic driving controller; the automatic parking controller may be configured to output the first control signal requesting a first region of a video captured by the camera when the vehicle state is the first state; the camera may be configured to output a video signal indicating the first region of the video in response to the first control signal; the automatic driving controller may be configured to output the second control signal requesting a second region of the video captured by the camera when the vehicle state is the second state; and the camera may be configured to output a video signal indicating the second region of the video in response to the second control signal.

With the above configuration, the controller that controls the camera can be switched between the automatic parking controller and the automatic driving controller.

A vehicle control method according to a second aspect of the present disclosure is performed by a vehicle control system including a sensor, a first controller connected to the sensor via a first signal line, the first controller being configured to receive a signal output from the sensor via the first signal line, and output a first control signal for controlling the sensor via the first signal line, and a second controller connected to the first controller via a second signal line, the second controller being configured to receive the signal output from the sensor via the first signal line and the second signal line, and output a second control signal for controlling the sensor via the first signal line and the second signal line. The vehicle control method includes: causing the sensor to operate according to the first control signal output from the first controller via the first signal line when a vehicle state that indicates a state of a vehicle is a first state; and causing the sensor to operate according to the second control signal output from the second controller via the first signal line and the second signal line when the vehicle state is a second state.

According to the above aspect, the controller that controls the sensor can be switched according to the state of the vehicle.

A controller according to a third aspect of the present disclosure is in a vehicle control system, including a sensor, the controller connected to the sensor via a first signal line, the controller being configured to receive a signal output from the sensor via the first signal line, and output a first control signal for controlling the sensor via the first signal line, and a second controller connected to the controller via a second signal line, the second controller being configured to receive the signal output from the sensor via the first signal line and the second signal line, and output a second control signal for controlling the sensor via the first signal line and the second signal line. The controller includes a processor configured to: stop transmission of the second control signal output from the second controller to the sensor when a vehicle state that indicates a state of a vehicle is a first state; and transmit the second control signal output from the second controller to the sensor when the vehicle state is a second state.

According to the above aspect, the controller that controls the sensor can be switched according to the state of the vehicle.

A non-transitory storage medium according to a fourth aspect of the present disclosure stores a program that are executable by a computer that configures a controller in vehicle control system and that cause the computer to perform functions. The vehicle control system includes a sensor, the controller connected to the sensor via a first signal line, the controller being configured to receive a signal output from the sensor via the first signal line, and output a first control signal for controlling the sensor via the first signal line, and a second controller connected to the controller via a second signal line, the second controller being configured to receive the signal output from the sensor via the first signal line and the second signal line, and output a second control signal for controlling the sensor via the first signal line and the second signal line. The functions includes: stopping transmission of the second control signal output from the second controller to the sensor when a vehicle state that indicates a state of a vehicle is a first state; and transmitting the second control signal output from the second controller to the sensor when the vehicle state is a second state.

According to the above aspect, the controller that controls the sensor can be switched according to the state of the vehicle.

What is claimed is:

1. A vehicle control system for a vehicle, the vehicle control system comprising:
    a camera mounted on the vehicle;
    a drive recorder controller connected to the camera via a first signal line, the drive recorder controller includes a signal processing circuit, the drive recorder controller being configured to:
        store a video signal output from the camera in a predetermined storage unit,
        receive a signal output from the camera via the first signal line, and
        output a first control signal for controlling the camera via the first signal line; and
    an electronic inner mirror controller connected to the drive recorder controller via a second signal line, the first signal line and the second signal line are connected via the signal processing circuit, the electronic inner mirror controller being configured to:
        operate when ignition power of the vehicle is on;
        receive the signal output from the camera via the first signal line and the second signal line, and
        output a second control signal for controlling the camera via the first signal line and the second signal line,
    wherein
    the camera is configured to:
        operate according to the first control signal output from the drive recorder controller via the first signal line when a vehicle state that indicates a state of the vehicle is a first state, the first state is a state in which the ignition power is off state, and operate according to the second control signal output from the electronic inner mirror controller via the first signal line and the second signal line when the vehicle state is a second state, the second state is a state in which the ignition power is on, wherein:

the signal processing circuit is configured to:

transmit a signal transmitted via the first signal line to the second signal line, and transmit a signal transmitted via the second signal line to the first signal line; and the drive recorder controller is configured to:

perform control to stop signal transmission of the signal processing circuit when the vehicle state is the first state, and perform control to enable the signal transmission of the signal processing circuit when the vehicle state is the second state.

2. The vehicle control system according to claim 1, wherein in the first state the ignition power is off and a predetermined or greater impact on the vehicle has been detected.

3. The vehicle control system according to claim 1, wherein the drive recorder controller is configured to perform control to operate the signal processing circuit within a time in which the electronic inner mirror controller is started when the vehicle state changes from the first state to the second state.

4. A vehicle control method that is performed by a vehicle control system for a vehicle, the vehicle control system including:

a camera mounted on the vehicle, a drive recorder controller connected to the camera via a first signal line, the drive recorder controller includes a signal processing circuit, the drive recorder controller being configured to:

store a video signal output from the camera in a predetermined storage unit, receive a signal output from the camera via the first signal line, and output a first control signal for controlling the camera via the first signal line, and an electronic inner mirror controller connected to the drive recorder controller via a second signal line, the first signal line and the second signal line are connected via the signal processing circuit, the electronic inner mirror controller being configured to:

operate when ignition power of the vehicle is on, receive the signal output from the camera via the first signal line and the second signal line, and output a second control signal for controlling the camera via the first signal line and the second signal line, the vehicle control method comprising:

causing the camera to operate according to the first control signal output from the drive recorder controller via the first signal line when a vehicle state that indicates a state of the vehicle is a first state, the first state is a state in which the ignition power is off state;

causing the camera to operate according to the second control signal output from the electronic inner mirror controller via the first signal line and the second signal line when the vehicle state is a second state, the second state is a state in which the ignition power is on:

cause the signal processing circuit to transmit a signal transmitted via the first signal line to the second signal line;

cause the signal processing circuit to transmit a signal transmitted via the second signal line to the first signal line;

cause the drive recorder controller to perform control to stop signal transmission of the signal processing circuit when the vehicle state is the first state; and cause the drive recorder controller to perform control to enable the signal transmission of the signal processing circuit when the vehicle state is the second state.

5. A drive recorder controller in a vehicle control system for a vehicle, the vehicle control system including:

a camera mounted on the vehicle, the drive recorder controller connected to the camera via a first signal line, the drive recorder controller being configured to:

store a video signal output from the camera in a predetermined storage unit, receive a signal output from the camera via the first signal line, and output a first control signal for controlling the camera via the first signal line, and an electronic inner mirror controller connected to the drive recorder controller via a second signal line, the electronic inner mirror controller being configured to:

operate when ignition power of the vehicle is on, receive the signal output from the camera via the first signal line and the second signal line, and output a second control signal for controlling the camera via the first signal line and the second signal line, the drive recorder controller comprising:

a signal processing circuit, the first signal line and the second signal line are connected via the signal processing circuit, the signal processing circuit is configured to:

transmit a signal transmitted via the first signal line to the second signal line, and transmit a signal transmitted via the second signal line to the first signal line; and a processor configured to:

stop transmission of the second control signal output from the electronic inner mirror controller to the camera when a vehicle state that indicates a state of the vehicle is a first state, the first state is a state in which the ignition power is off state;

transmit the second control signal output from the electronic inner mirror controller to the camera when the vehicle state is a second state, the second state is a state in which the ignition power is on;

perform control to stop signal transmission of the signal processing circuit when the vehicle state is the first state; and perform control to enable the signal transmission of the signal processing circuit when the vehicle state is the second state.

6. A non-transitory storage medium storing a program that are executable by a computer that configures a drive recorder controller in vehicle control system for a vehicle and that cause the computer to perform functions, the vehicle control system including:

a camera mounted on the vehicle, the drive recorder controller connected to the camera via a first signal line, the drive recorder controller includes a signal processing circuit, the drive recorder controller being configured to:

store a video signal output from the camera in a predetermined storage unit, receive a signal output from the camera via the first signal line, and output a first control signal for controlling the camera via the first signal line, and an electronic inner mirror controller connected to the drive recorder controller via a second signal line, the first signal line and the second signal line are connected via the signal processing circuit, the electronic inner mirror controller being configured to:

operate when ignition power of the vehicle is on, receive the signal output from the camera via the first signal line and the second signal line, and output a second control signal for controlling the camera via the first signal line and the second signal line, the signal processing circuit is configured to:
   transmit a signal transmitted via the first signal line to the second signal line, and
   transmit a signal transmitted via the second signal line to the first signal line; and the functions comprising:

stopping transmission of the second control signal output from the electronic inner mirror controller to the camera when a vehicle state that indicates a state of a vehicle is a first state, the first state is a state in which the ignition power is off state;

transmitting the second control signal output from the electronic inner mirror controller to the camera when the vehicle state is a second state, the second state is a state in which the ignition power is on;

perform control to stop signal transmission of the signal processing circuit when the vehicle state is the first state; and perform control to enable the signal transmission of the signal processing circuit when the vehicle state is the second state.

\* \* \* \* \*